June 3, 1930.   E. F. SMITH   1,761,755
PROCESS OF MAKING METAL WORKING TOOLS
Filed Aug. 14, 1926
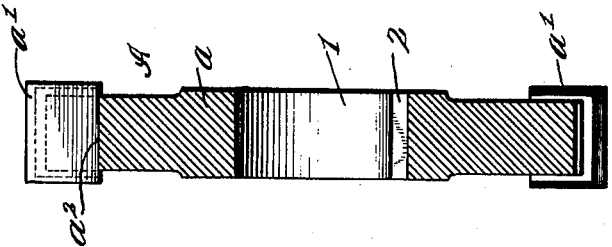
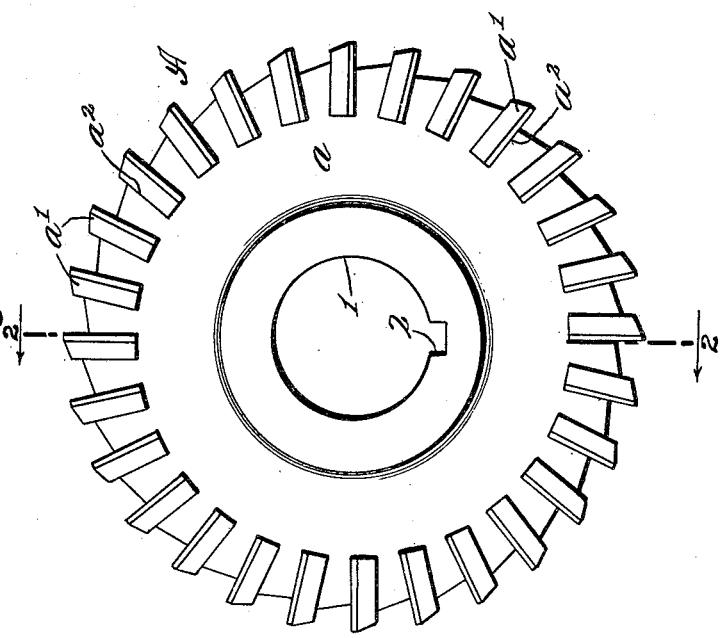
Inventor
Edward F. Smith
By [signature]
atty.

Patented June 3, 1930

1,761,755

UNITED STATES PATENT OFFICE

EDWARD F. SMITH, OF CHICAGO, ILLINOIS, ASSIGNOR TO HAYNES STELLITE COMPANY, OF KOKOMO, INDIANA, A CORPORATION OF INDIANA

PROCESS OF MAKING METAL-WORKING TOOLS

Application filed August 14, 1926. Serial No. 129,252.

This invention relates to metal working tools having inset teeth and to a process of making the same.

One of the principal objects of the invention is to provide a tool of the type specified in which the separate teeth, when made of high speed steel, may be hardened and tempered before they are secured in the marginal slots in the body portion of the tool and to avoid drawing or affecting the temper of the teeth by the process of securing them in position.

Heretofore, so far as I am aware, in tools of the type specified, the separate cutting teeth have uniformly been secured in the marginal slots in the body portion thereof by hard solder or brazing compounds, the fusing temperatures of which approximate or exceed the temperature to which the separate inset teeth are drawn and which provide a relatively strong connection between the body portions of the tools and the separate cutting teeth.

In according with my invention, I attain the object thereof as it relates to means for securing the separate cutting teeth in the marginal slots in the body portions of the cutters, by securing said teeth in position by means of soft solder, such as is commercially used by tinsmiths, and consisting of a mixture of substantially equal parts of tin and lead.

So far as I am aware, metal working tools having the characteristics specified were not known or used prior to my invention, and it is my belief that I am the first one to discover that it is feasible and practicable to make high duty tools—in which the separate cutting teeth are made of hardened and tempered high speed steel or non-ferrous alloys—by securing the separate cutting teeth in the marginal flanges in the body portions of the tools by means of soft solder.

Another object of the invention is to provide an improved process of manufacture whereby separate cutting teeth, when made of high speed steel, may be pre-hardened and tempered before they are secured in the marginal slots in the body portions of the tools and their temper will not be drawn or affected by the operation of securing them in position.

I attain the foregoing object by finishing the body portions of the tools and the cutting teeth, when made of high speed steel, separately; hardening and tempering the teeth, inserting them into the marginal slots in the body portion of the tool and securing them therein preferably by immersing the assembled tool in a bath of molten soft solder having temperature less than the drawing temperature of the teeth.

Before the finished teeth are inserted into the slots in the body portions of the tools, they are preferably pre-coated with soft solder. Such pre-coating is practically essential when the separate inset teeth are made of non-ferrous alloy. Pre-coating of high speed steel is advantageous in that it insures a uniform and even solder joint between the teeth and the body portions of the tools but pre-coating may be omitted.

My invention also comprises the various other features, combinations of features and details of construction hereinafter described and claimed.

In the accompanying drawings in which my invention is fully illustrated,

Figure 1 is a side view of a cutter embodying my invention and improvements and constructed in accordance with my improved process; and Figure 2 is a sectional view thereof on the line 2—2 of Fig. 1.

Describing the invention with particular reference to the drawings, A designates a tool which comprises a body portion $a$ with separate cutting teeth $a'$ secured in marginal slots $a^2$ formed in the body portion $a$.

The tool A is a milling cutter which is provided with a hole 1 at its center, adapted to receive an arbor on which the cutter may be mounted in use and with a keyway 2 adapted to receive a key to prevent turning of the cutter on the arbor. I do not desire to limit my invention to the making of milling cutters, as many other tools may be made in accordance with my invention. It is especially useful in the manufacture of tools which are known to the trade as "small tools", such as shell end mills, spot facing tools, taps, hobbs, and special tools and cutters for a large variety of uses.

The cutting teeth $a'$ are preferably made of high speed steel or of one of the commercial non-ferrous alloys. The non-ferrous alloy, Stellite is particularly well adapted for the practice of my invention.

In its broadest aspect, my invention consists in securing the cutting teeth $a'$ in the marginal slots in the body portion of the tool by means of soft solder, such as is commonly used by tinsmiths and consisting of a mixture of substantially equal parts of tin and lead. Regardless of the character of the cutting teeth, I have discovered that soft solder will provide a strong union between the body portions of the tools and the inset teeth that is sufficient to withstand the stresses to which the tool will be subjected in use without breaking, loosening or permitting the teeth to dislodge. As far as I am aware, I am the first to discover that soft solder can be effectively used for this purpose.

The body portions and the cutting teeth $a'$ are finished separately, the body portions being provided with the marginal slots $a^2$ adapted to receive the cutting teeth $a'$. When the cutting teeth $a'$ are made of high speed steel, they are first hardened and drawn to the proper temper. They are inserted into the slots $a^2$ in the body portion of the tool and initially secured in said slots by suitable temporary securing means, as by wire applied thereto. Then the structure is immersed in a bath of molten soft solder having a temperature less than the drawing temperature of said cutting teeth.

With non-ferrous alloy, the body portions and the cutting teeth are first finished separately, the cutting teeth are inserted into the marginal slots in the body portion of the tool and secured therein by suitable temporary fastening means, then the assembled tool is immersed in the bath of molten soft solder.

In using non-ferrous alloys, the cutting teeth $a'$ are preferably pre-coated with soft solder. It is necessary to do this in order to insure a continuous solder joint. Although it is not essential to pre-coat the cutting teeth which are composed of high speed steel, it has been found to be advantageous, as the coating insures a perfect solder joint between the contacting surfaces of the body portion and the cutting teeth.

I claim:—

1. The process of making cutting tools consisting of a slotted body having preformed and tempered cutting teeth secured in the slots which comprises inserting the tempered teeth in the slotted body and immersing the assembled parts in melted soft solder at a temperature sufficiently low to preclude drawing the temper of the teeth.

2. The process of manufacturing cutting tools comprising body portions provided with marginal slots and separate cutting teeth secured in said marginal slots by means of soft solder, which consists in finishing the body portions of the tools and the cutting teeth separately, pre-coating the cutting teeth with soft solder, inserting them into the slots in the body portions of the tools and immersing the assembled tools in a bath of molten soft solder having a temperature below the temper drawing points of the teeth.

3. The process of manufacturing cutting tools comprising body portions provided with marginal slots and separate cutting teeth made of high speed steel secured in said marginal slots by means of soft solder, which consists in finishing the body portions of the tools and the cutting teeth separately, hardening and tempering the teeth, inserting the teeth into the marginal slots in the body portions of the tools and securing them therein by immersing the assembled tools in a bath of molten soft solder having a temperature less than the drawing temperature of the teeth.

In witness that I claim the foregoing as my invention, I affix my signature this 10th day of August, A. D. 1926.

EDWARD F. SMITH.